United States Patent
Lin et al.

(10) Patent No.: US 9,335,616 B2
(45) Date of Patent: May 10, 2016

(54) OPTICAL DEVICE UTILIZED IN LASER PROJECTOR

(71) Applicant: DELTA ELECTRONICS, INC., Taoyuan Hsien (TW)

(72) Inventors: Chia-Jui Lin, Taoyuan Hsien (TW); Hsiu-Ming Chang, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 258 days.

(21) Appl. No.: 14/096,257

(22) Filed: Dec. 4, 2013

(65) Prior Publication Data

US 2015/0029472 A1    Jan. 29, 2015

(30) Foreign Application Priority Data

Jul. 24, 2013    (CN) ...................... 2013 2 0443781 U

(51) Int. Cl.
*G03B 21/16* (2006.01)
*G03B 21/20* (2006.01)
*H04N 9/31* (2006.01)

(52) U.S. Cl.
CPC .............. *G03B 21/16* (2013.01); *G03B 21/204* (2013.01); *G03B 21/2033* (2013.01); *H04N 9/3144* (2013.01); *H04N 9/3158* (2013.01)

(58) Field of Classification Search
CPC .... G03B 21/16; G03B 21/204; H04N 9/3111; H04N 9/3161
USPC ......... 353/52–61; 362/84, 294, 282, 317, 341
See application file for complete search history.

(56) References Cited

U.S. PATENT DOCUMENTS

| | | | |
|---|---|---|---|
| 7,000,417 B2 | 2/2006 | Evans et al. | |
| 7,859,554 B2 | 12/2010 | Young | |
| 2009/0141248 A1 | 6/2009 | Suzuki | |
| 2013/0215397 A1* | 8/2013 | Matsubara | G03B 21/204 353/57 |
| 2013/0250546 A1* | 9/2013 | Hu | F21V 9/08 362/84 |
| 2013/0271947 A1* | 10/2013 | Finsterbusch | F21K 9/56 362/19 |
| 2013/0278902 A1* | 10/2013 | Chen et al. | G03B 21/204 353/31 |
| 2014/0198304 A1* | 7/2014 | Sun et al. | G03B 21/16 353/61 |

FOREIGN PATENT DOCUMENTS

| | | |
|---|---|---|
| CN | 101702074 A | 5/2010 |
| CN | 102722069 A | 10/2012 |
| TW | 201100943 A | 1/2011 |
| TW | I337294 B | 2/2011 |
| TW | 201229651 A | 7/2012 |

\* cited by examiner

*Primary Examiner* — Sultan Chowdhury
(74) *Attorney, Agent, or Firm* — Hauptman Ham, LLP

(57) ABSTRACT

An optical device utilized in a laser projector includes a circulatory air channel, a phosphor wheel disposed in the circulatory air channel, a thermal exchanger partially disposed in the circulatory air channel, and an air guiding component disposed in the circulatory air channel for guiding an air provided by the thermal exchanger toward the phosphor wheel. The temperature of the air passing through the phosphor wheel is lower than an environment temperature.

9 Claims, 2 Drawing Sheets

OPTICAL DEVICE UTILIZED IN LASER PROJECTOR

RELATED APPLICATIONS

This application claims priority to China Application Serial Number 201320443781.2, filed Jul. 24, 2013, which is herein incorporated by reference.

BACKGROUND

1. Field of Invention

The present invention relates to a laser projector. More particularly, the present invention relates to an optical device in the laser projector.

2. Description of Related Art

Optical projectors have been applied in many fields since first being developed. They serve an expanded range of purposes, from use in consumer products to high-tech devices. For example, the optical projectors may be used in projective systems for projecting enlarged images to facilitate presentations given in conferences, or used in projection screens or televisions for projecting and displaying images in real time.

A conventional projector typically includes a light source module and an image processor. The light emitted from the light source module is collected by optical components and is processed by a filter and a color wheel. The processed light is supplied to the image processor and subsequently projected onto a projection screen.

With constant development of the projectors, a laser light source and a phosphor wheel have been utilized in the light source module for providing light beams with various wavelengths. However, the energy carried by the laser light beam is highly intensified, and the temperature of the wheel may be very high after a time of receiving the laser light beam. As a result, the phosphor on the phosphor wheel may be deteriorated which decreases the illuminating efficiency of the phosphor. As brightness requirements for projectors continue to increase, so does the energy carried by laser light beams generated therein. Hence, the problem of phosphor deterioration from the high temperatures is becoming increasingly severe.

SUMMARY

The present invention provides an optical device utilized on a laser projector, which provides an air colder than an environment air for cooling a phosphor wheel, so that the problem of phosphor damaged due to high temperature can be prevented.

An aspect of the invention provides an optical device utilized in a laser projector, which includes a circulatory air channel, a phosphor wheel disposed in the circulatory air channel, a thermal exchanger partially disposed in the circulatory air channel, and an air guiding component disposed in the circulatory air channel for guiding an air provided by the thermal exchanger toward the phosphor wheel. The temperature of the air is lower than an environment temperature.

In one or more embodiments, the thermal exchanger can be a thermoelectric cooling chip, the thermoelectric chip has a cold side and a hot side, the cold side is disposed in the circulatory air channel, and the hot side is partially exposed of the circulatory air channel.

In one or more embodiments, the optical device further includes a cooling fan disposed adjacent to the hot side for dissipating heat from the hot side.

In one or more embodiments, the air guiding component is disposed adjacent to the cold side, and the air guiding component is a blower or a fan.

In one or more embodiments, the air guiding component and the phosphor wheel are disposed at opposite sides of the cold side respectively.

In one or more embodiments, the optical device further includes a laser light source for providing a laser beam emitting to the phosphor wheel.

In one or more embodiments, the circulatory air channel comprises a first light passage and a second light passage disposed corresponding to a light receiving side and a light emitting side of the phosphor wheel respectively.

In one or more embodiments, the first light passage and the second light passage can be plane glasses.

In one or more embodiments, the optical device further includes at least one cooling fins set partially disposed in the circulatory air channel.

In one or more embodiments, a shape of the circulatory air channel can be a rectangle.

The present disclosure uses the air cooled by the thermal exchanger for cooling the phosphor wheel thereby enhancing the cooling efficiency to the phosphor wheel. Furthermore, the air circularly flowing in the circulatory air channel is cleaner than the air outside of the leaser projector, the problem of the dust pollution carried by the outside air can be prevented.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
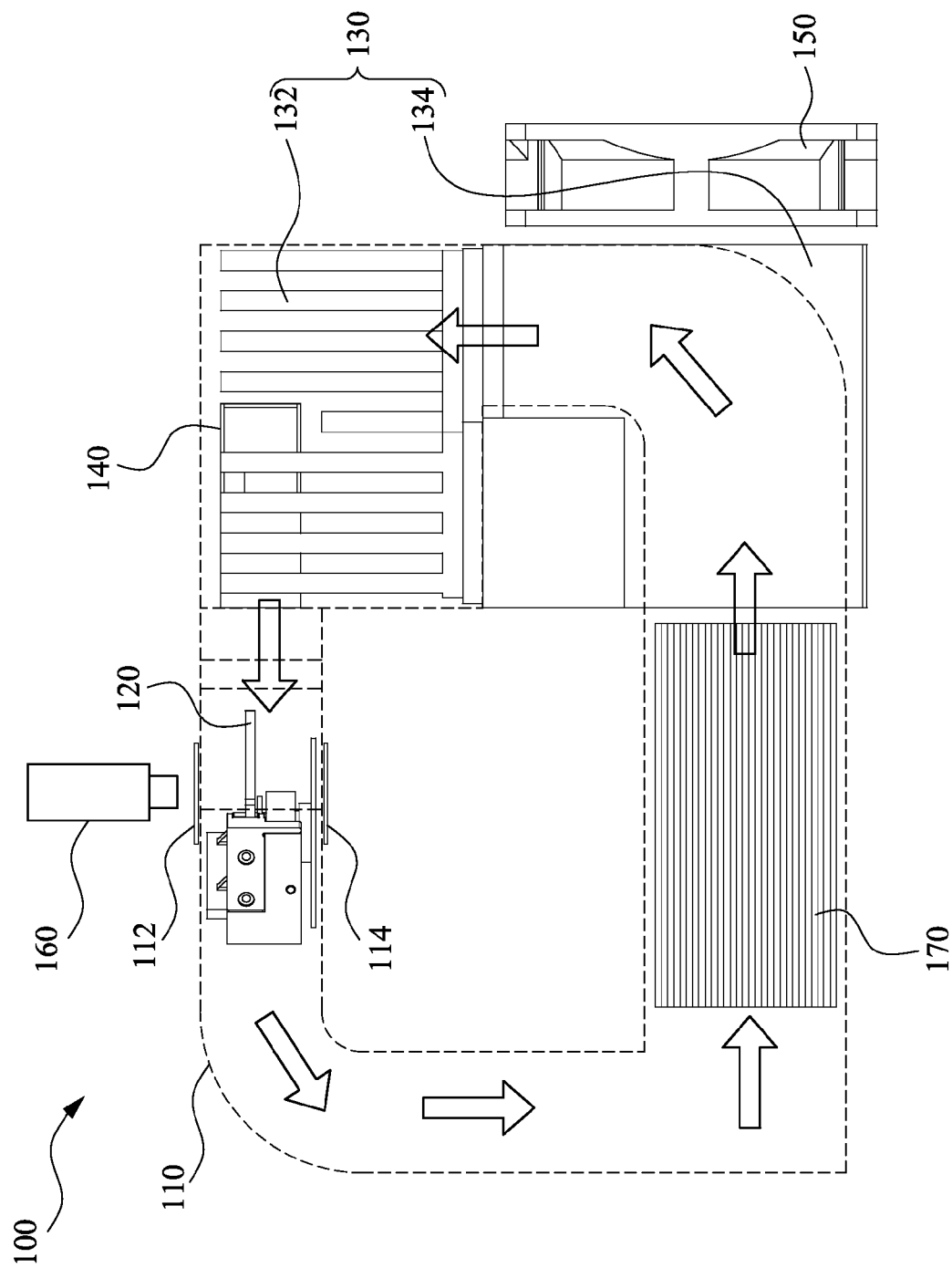
FIG. 1 is a top view of an embodiment of an optical device utilized in a laser projector of the invention.

Reference will now be made in detail to the present embodiments of the invention, examples of which are illustrated in the accompanying drawings. Wherever possible, the same reference numbers are used in the drawings and the description to refer to the same or like parts.

In order to solve the problem of phosphor wheel being damaged because of the raising temperature due to the high energy carried by the laser beam, a fan is widely used for cooling the phosphor wheel with environment air. However, the cooling efficiency by using only the fan is pretty poor. Therefore, the present invention provides a thermal exchanger and a circulatory air channel for cooling the phosphor wheel with a cold air colder than the environment air thereby improving the heat dissipating efficiency of the phosphor wheel.

Figure 2:
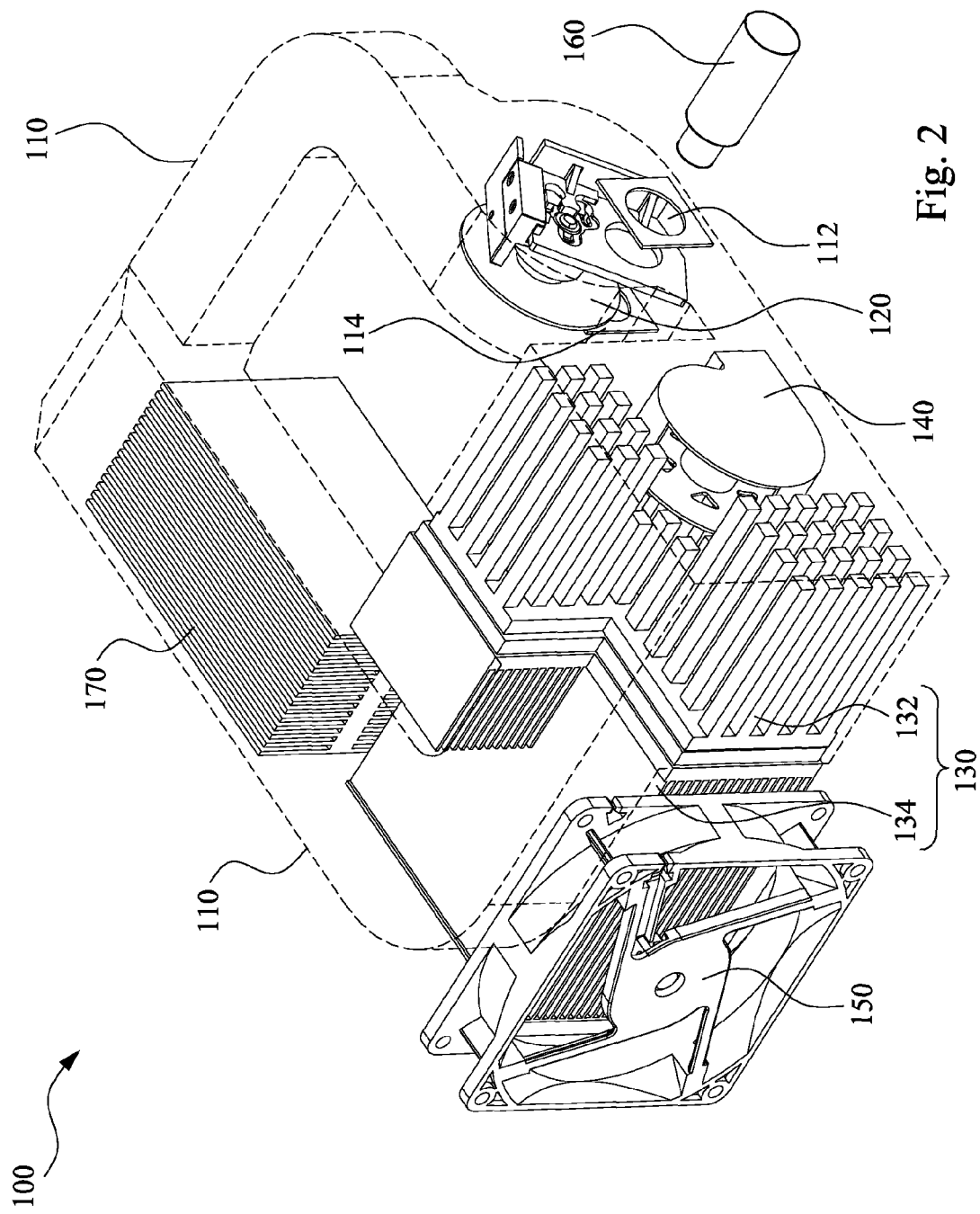
FIG. 2 is an oblique view of the embodiment of the optical device utilized in the laser projector of the invention.

FIG. 1 is a top view of an embodiment of an optical device utilized in a laser projector of the invention. FIG. 2 is an oblique view of the embodiment of the optical device utilized in the laser projector of the invention. The optical device 100 is utilized in a laser projector. The optical device 100 includes a circulatory air channel 110, a phosphor wheel 120 disposed in the circulatory air channel 110, a thermal exchanger 130 partially disposed in the circulatory air channel 110, and an air guiding component 140 disposed in the circulatory air channel 110.

In order to better perform the features of the present invention, the circulatory air channel 110 is illustrated with broken line in FIG. 1 and FIG. 2.

The circulatory air channel 110 provides a channel for allowing an air flowing within circularly, and the air is basically recyclable utilized in the circulatory air channel 110. The thermal exchanger 130 provides a cold air, which has a temperature lower than the environment temperature, flowing in the circulatory air channel 110. The environment temperature means a room temperature outside of the laser projector, or the temperature in laser projector but not within the circulatory air channel 110. The temperature of the cold air provided by the thermal exchanger 130 must be colder than both above environment temperatures.

The air guiding component 140 is disposed in the circulatory air channel 110. The air guiding component 140 is disposed between the thermal exchanger 130 and the phosphor wheel 120 for guiding the cold air provided by the thermal exchanger 130 to the phosphor wheel 120 for cooling the phosphor wheel 120. The air guiding component 140 can be a blower or a fan. The temperature of the cold air provided by the thermal exchanger 130 is lower than the temperature of the environment temperature. Such that, comparing to conventional cooling method by only using the environment air, the present invention has higher cooling efficiency by using the cold air provided by the thermal exchanger 130.

The cold air provided by the thermal exchanger 130 is guided via the air guiding component 140 toward the phosphor wheel 120 for cooling the phosphor wheel 120 by thermal exchanging process. The cold air is heated after being thermal exchanged with the phosphor wheel 120. The heated air flows in the circulatory air channel 110 along a predetermined air flow direction. The heated air once again passes the thermal exchanger 130 for being cooled and becomes the cold air. The cold air cooled by the thermal exchanger 130 is once again guided to the phosphor wheel 120 for cooling the phosphor wheel 120 via the air guiding component 140. The air is basically recyclable utilized in the circulatory air channel 110.

The circulatory air channel 110 can be substantially regarded as a closed chamber, so that the air is utilized repeatedly in the circulatory air channel 110. The air circularly flowing in the circulatory air channel 110 can be cooled by the thermal exchanger 130 for cooling the phosphor wheel 120. Furthermore, the air circularly flowing in the circulatory air channel 110 is cleaner than the air outside of the leaser projector, which may include dust, soot or other pollutions. The problem of poor cooling efficiency and the dust pollution carried by only using the fan inducing the outside air raised in prior art can be prevented in the present disclosure.

The thermal exchanger 130 can be a thermoelectric cooling chip. The thermal exchanger 130 includes a cold side 132 and a hot side 134. The cold side 132 includes a plurality of cold side fins. The hot side 134 includes a plurality of hot side heat dissipating fins. The cold side 132 is located in the circulatory air channel 110. The cold side 132 and the phosphor 120 are disposed at opposite sides of the air guiding component 140. The cold air provided by the cold side 132 of the thermal exchanger 130 is guided by the air guising component 140 toward the phosphor wheel 120 for cooling the phosphor wheel 120. The hot side 134 is partially exposed of the circulatory air channel 110. The hot side 134 is utilized for heat dissipating by thermal exchanging with the air outside of the circulatory air channel 110.

The optical device 100 further includes a cooling fan 150 for cooling the hot side 134 of the thermal exchanger 130. The cooling fan 150 is disposed outside of the circulatory air channel 110. The cooling fan 150 is disposed adjacent to the hot side 134 for dissipating heat from the hot side 134 thereby improving heat dissipating efficiency of the hot side 134.

The optical device 100 further includes a laser light source 160. The laser light source 160 provides a laser beam emitting to the phosphor wheel 120. In order to make the laser beam entering and exiting the circulatory air channel 110, the circulatory air channel 110 further includes a first light passage 112 and a second light passage 114. The first light passage 112 and the second light passage 114 are disposed corresponding to a light receiving side and a light emitting side of the phosphor wheel 120 respectively. The first light passage 112 is disposed between the laser light source 160 and the phosphor wheel 120. The first light passage 112 and the second light passage 114 are made of transparent material, such as a glass, so that the laser beam may pass through the circulatory air channel 110, and the air may be kept in within the circulatory air channel 110. The first light passage 112 and the second light passage 114 can be plane glasses.

The laser beam with a first wavelength passes the first light passage 112 and emits onto the phosphor wheel 120. The laser beam with the first wavelength is converted by the phosphor wheel 120 and becomes a beam with a second wavelength. The beam with the second wavelength emits through the second light passage 114 and enters an image processing unit for imaging. In some embodiments, the second light passage 114 can be plane glass or lens for further adjusting light path.

In order to further improve the cooling efficiency to the phosphor wheel 120, the optical device 100 may optionally include at least one cooling fins set 170. A part of the cooling fins set 170 is disposed in the circulatory air channel 110, and another art of the cooling fins set 170 is exposed of the circulatory air channel 110. The air passed the phosphor wheel 120 is heated, and the heated air may heat exchange with the cooling fins set 170 thereby dissipating a part of heat carried by the heated air.

Although only one set of cooling fins set 170 and one thermal exchanger 130 are discussed in this embodiment, the number of the cooling fins set 170 and the thermal exchanger 130 is not limited and can be plural in other embodiments. A person having ordinary skill in the art may design the arrangement of the cooling fins set(s) 170 according to actual requirements.

The shape of the circulatory air channel 110 is substantially a rectangle. The cold side 132 of the thermal exchanger 130, the air guiding component 140 and the phosphor wheel 120 are basically placed at the same side of the circulatory air channel 110 in order to make the air flow smoothly.

The present disclosure uses the air cooled by the thermal exchanger for cooling the phosphor wheel thereby enhancing the cooling efficiency to the phosphor wheel. Furthermore, the air circularly flowing in the circulatory air channel is cleaner than the air outside of the leaser projector, the problem of the dust pollution carried by the outside air can be prevented.

Although the present invention has described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An optical device utilized in a laser projector comprising:
   a circulatory air channel;
   a phosphor wheel disposed in the circulatory air channel;
   a thermal exchanger partially disposed in the circulatory air channel; and
   an air guiding component disposed in the circulatory air channel for guiding an air provided by the thermal exchanger toward the phosphor wheel,
   wherein
      a temperature of the air passing through the phosphor wheel is lower than an environment temperature,
      the thermal exchanger is a thermoelectric cooling chip,
      the thermoelectric chip has a cold side and a hot side,
      the cold side is disposed in the circulatory air channel, and
      the hot side is partially exposed in the circulatory air channel.

2. The optical device utilized in the laser projector of claim 1, further comprising a cooling fan disposed adjacent to the hot side for dissipating heat from the hot side.

3. The optical device utilized in the laser projector of claim 1, wherein the air guiding component is disposed adjacent to the cold side, and the air guiding component is a blower or a fan.

4. The optical device utilized in the laser projector of claim 3, wherein the air guiding component and the phosphor wheel are disposed at opposite sides of the cold side respectively.

5. The optical device utilized in the laser projector of claim 1, further comprising a laser light source for providing a laser beam emitting to the phosphor wheel.

6. The optical device utilized in the laser projector of claim 5, wherein the circulatory air channel comprises a first light passage and a second light passage disposed corresponding to a light receiving side and a light emitting side of the phosphor wheel respectively.

7. The optical device utilized in the laser projector of claim 6, wherein the first light passage and the second light passage are plane glasses.

8. The optical device utilized in the laser projector of claim 1, further comprising at least one cooling fins set partially disposed in the circulatory air channel.

9. The optical device utilized in the laser projector of claim 1, wherein the circulatory air channel is rectangle-shaped in cross section.

* * * * *